(12) United States Patent
Harton et al.

(10) Patent No.: US 8,254,552 B2
(45) Date of Patent: Aug. 28, 2012

(54) SYSTEM AND METHOD FOR PROVIDING A RECOVERY MODE IN A SESSION INITIATION PROTOCOL (SIP) ENVIRONMENT

(75) Inventors: David C. Harton, Apex, NC (US); Richard A. Frisk, Cary, NC (US); Ho Bao, Richardson, TX (US); Clint D. Entrop, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1489 days.

(21) Appl. No.: 11/031,368

(22) Filed: Jan. 6, 2005

(65) Prior Publication Data

US 2006/0146798 A1 Jul. 6, 2006

(51) Int. Cl.
*H04M 7/00* (2006.01)

(52) U.S. Cl. .............. 379/221.03; 379/202.01; 370/352; 455/518

(58) Field of Classification Search .................. 370/352, 370/395.3, 225; 455/519, 518, 507; 709/224; 379/265.01–266.1, 88.17, 88.18, 202.01–206.01, 379/221.03, 221.04, 221.15
See application file for complete search history.

(56) References Cited

U.S. PATENT DOCUMENTS

| | | | |
|---|---|---|---|
| 6,601,099 B1 * | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |
| 6,785,246 B2 | 8/2004 | Foti | 370/261 |
| 6,788,676 B2 | 9/2004 | Partanen et al. | 370/352 |
| 7,508,754 B1 * | 3/2009 | Sankaranaraynan et al. | 370/225 |
| 2004/0235509 A1 * | 11/2004 | Burritt et al. | 455/519 |

* cited by examiner

*Primary Examiner* — Md S Elahee
(74) *Attorney, Agent, or Firm* — Baker Botts L.L.P.

(57) ABSTRACT

A method to be executed in a session initiation protocol (SIP) environment is provided that includes detecting, by a first agent, a potential lost connection associated with a signaling path. The signaling path couples a first endpoint and a second endpoint and is operable to exchange signaling data. The potential lost connection is associated with a call between the first and the second endpoint, the first agent being associated with the first endpoint. The method also includes communicating a reinvite to a second agent that is associated with the second endpoint in order to determine whether the call between the first endpoint and the second endpoint is active.

20 Claims, 2 Drawing Sheets

SYSTEM AND METHOD FOR PROVIDING A RECOVERY MODE IN A SESSION INITIATION PROTOCOL (SIP) ENVIRONMENT

TECHNICAL FIELD OF THE INVENTION

This invention relates generally to communications and, more particularly, to a system and a method for providing a recovery mode feature in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as session initiation protocol (SIP), for example) become available to the consumer, new protocols need to be developed in order to optimize this emerging technology. For example, one problem often encountered by endpoints is having calls dropped, torn down, or interrupted because some element or module presumes the call to be inactive. This mishandling of the call may primarily be due to an incorrect assumption about the state of the call: an assumption, which may have been based on a deficiency in signaling connections or paths. For example, a signaling pathway may be experiencing a problem, but that does not preclude the bearer path from still being functional. Performance suffers during these scenarios and participants can become frustrated because their calls are being incorrectly managed (i.e. dropped, interrupted, etc.). Accordingly, the issues in recognizing the current state of a call presents a significant challenge for any employee, employer, individual, or endpoint that seeks to execute a successful communication session.

SUMMARY OF THE INVENTION

From the foregoing, it may be appreciated by those skilled in the art that a need has arisen for an improved process that provides an effective solution for administrators that manage a communications architecture. In accordance with an embodiment of the present invention, a system and a method for providing an enhanced recovery mode are provided that substantially eliminate or greatly reduce disadvantages and problems associated with conventional communication strategies and protocols.

According to one embodiment of the present invention, a method to be executed in a session initiation protocol (SIP) environment is provided that includes detecting, by a first agent, a potential lost connection associated with a signaling path. The signaling path couples a first endpoint and a second endpoint and is operable to exchange signaling data. The potential lost connection is associated with a call between the first and the second endpoint, the first agent being associated with the first endpoint. The method also includes communicating a reinvite to a second agent that is associated with the second endpoint in order to determine whether the call between the first endpoint and the second endpoint is active.

Certain embodiments of the present invention may provide a number of technical advantages. For example, according to one embodiment of the present invention, an architecture and a process are provided that offers an effective recovery mode for communication sessions. This would optimize resources for a given communications architecture. Without the capabilities of the present invention, resources would not be properly conserved. For example, during peak hours, call attempt rates would suffer because of the unavailability of possible connections. In other scenarios, security or quality of service parameters may deteriorate. The present invention overcomes these issues by offering an intelligent system that keeps calls alive and, further, avoids interrupting calls that are functional.

Proper detection of a signaling path error is provided by the present invention in ensuring that a call is active. In cases where the call is dormant or stagnant, then the associated network resources may be appropriately cleaned up. Hence, the present invention offers call resiliency, as well as enhanced efficiency in resource management.

Another technical advantage associated with one embodiment of the present invention relates to flexibility. Implementation of the present invention does not have to burden or interfere with current system operations. Such an architecture can readily be extended to legacy scenarios that seek to upgrade their system functionalities. This can be done with minimal effort, as the present invention may simply leverage an existing communications platform in offering the recovery mode feature as outlined herein.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
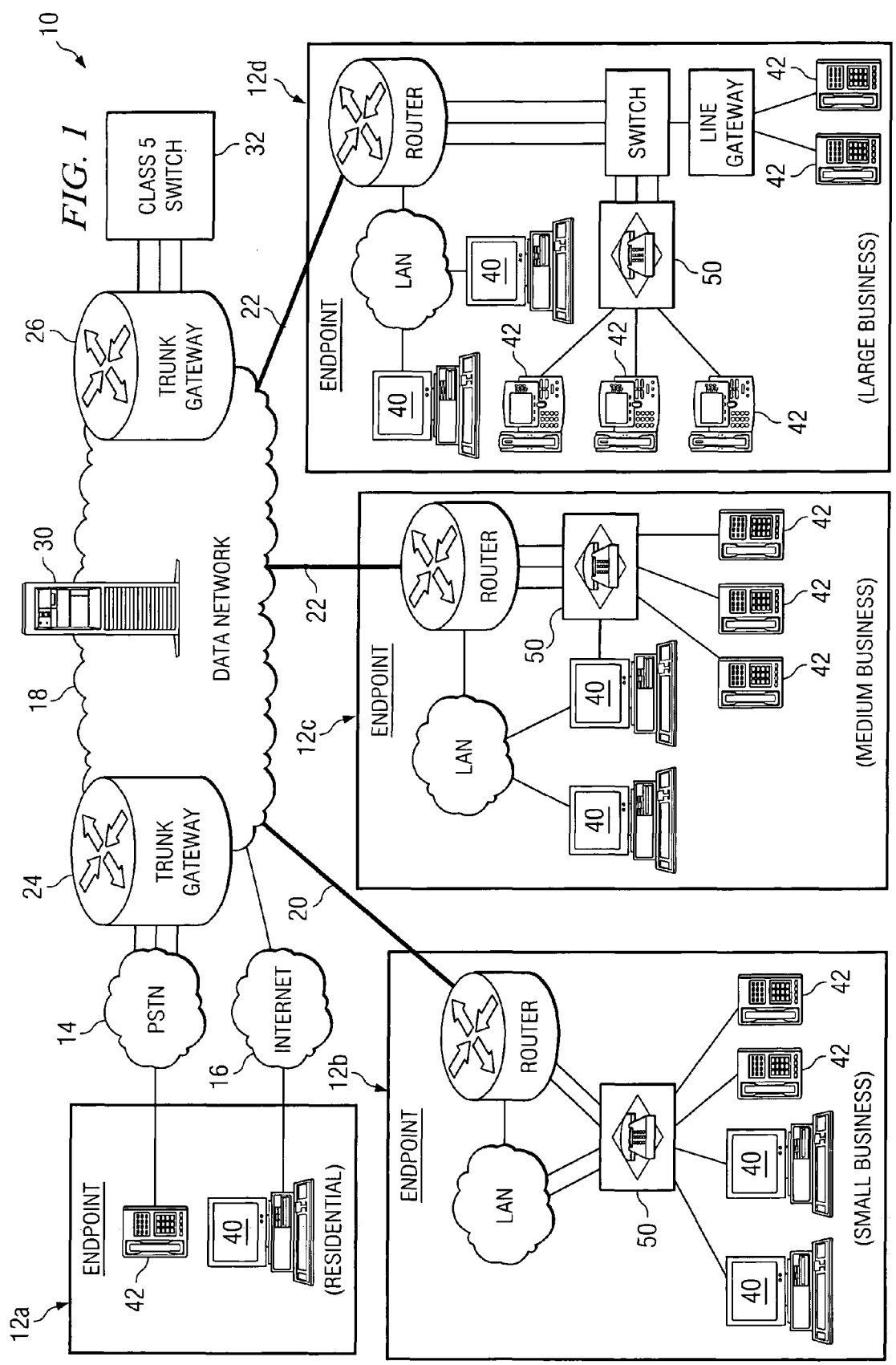
FIG. 1 is a simplified block diagram illustrating a communication system that may implement an enhanced recovery mode feature in accordance with one embodiment of the present invention.

FIG. 1 is a simplified block diagram of a communication system 10 for communicating, receiving, and transmitting data in a session initiation protocol (SIP) environment. Communication system 10 includes endpoints 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Endpoint 12b represents a small business entity, which consists of a local area network (LAN), a router, several computers 40, and several telephones 42.

Endpoint 12c represents a medium business entity, which consists of a LAN, router, a private branch exchange (PBX) or key system, several computers 40, and several telephones 42. Endpoint 12d is a large business entity, which consists of a LAN, a router, a switch, a line gateway, several computers 40, and several telephones 42. Note that endpoints 12b, 12c, and 12d each include a communications platform 50, which is operable to communicate with any number of devices (e.g. telephones 42 and/or computer 40). In one embodiment, communications platform 50 is a Call Manager element, which is manufactured by Cisco Systems, Inc. of San Jose, Calif. The Call Manager element may be SIP-enabled. In other embodiments, communications platform 50 is any suitable unit that is operable to interface with end-user devices (e.g. telephone 42, computer 40, etc.).

In accordance with the teachings of the present invention, communication system 10 offers a recovery mode that determines whether or not a call is active before proceeding with any subsequent action. This capability alleviates concerns about dropping operational (i.e. active) calls or interrupting calls needlessly. A communications platform (e.g. a Call Manager) on either side of the call could get hung during certain communications. A natural response to this problem may be to incorrectly attempt to tear down the live call. This could be triggered by, for example, one or more session timers. The present invention offers a mechanism that can realize when a connection has been lost (i.e. the bearer path is functional but a problem with the signaling path has occurred). Note that, generally, there is no keep-alive tool between SIP signaling patterns. The present invention offers a proverbial "heartbeat" between two endpoints: constantly querying the far endpoint in cases where a lost connection is detected. In order to further explain and detail these operations and others, a number of additional examples are provided herein in this document and discussed below with reference to FIGS. 2-3.

Endpoints 12a-d are SIP-compatible elements that include hardware and/or software that is operable to receive and to transmit data (directly or indirectly) and to facilitate the enhanced recovery mode feature as outlined herein. In one embodiment, only communications platform 50 includes these elements and performs this function autonomously.

Note that the term "endpoint" encompasses a myriad of potential devices and infrastructure that may benefit from the operations of communication system 10. Endpoints 12a-d may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of endpoints 12a-d are malleable and can be readily changed, modified, rearranged, or reconfigured in order to achieve their intended operations as they pertain to the recovery mode function. As identified supra, software and/or hardware may reside in endpoints 12a-d in order to achieve the teachings of the enhanced recovery mode feature of the present invention. Specifically, such items may be included in (or loaded into) any targeted communications platform (e.g. communications platform 50, telephones 42 and/or computers 40). (Note that, in certain embodiments, communications platform(s) 50 may execute the requisite operations of the recovery mode feature without assistance from any other element.) However, due to their flexibility, these elements (i.e. telephones 42, computers 40, and communications platform 50) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session.

As SIP gains notoriety within the communications industry, it has become apparent that architectures need to be adapted to accommodate SIP communication sessions in an optimal fashion. SIP trunks are interfaces used to receive SIP messages from a SIP network. Those messages can be brought into communications platform 50 (e.g. the Call Manager). The messages may be brought into the platform using a back-to-back user agent (B2BUA) fashion, which may be included in any communications platform 50 (or provided in some other appropriate location or provided as its own separate component). As used herein in this document, the term "agent" refers to any element (e.g. a B2BUA) that seeks to facilitate a session involving a given endpoint. An agent may be included in the endpoint in any suitable fashion (e.g. within communications platform 50 or provided external thereto). Accordingly, in order to achieve the recovery mode feature of the present invention, each agent may include any suitable hardware, software, component, device, ASIC, processor, microprocessor, algorithm, ROM element, RAM element, EPROM, EEPROM, FPGA, or any other suitable element or object that is operable to facilitate the operations thereof. Considerable flexibility is provided by the structure of the agents.

In a given architecture, the different devices involved in a call are located throughout the network. In addition, the bearer path (i.e. the path that actually carries voice packets) is different from the signaling path, which exchanges signaling data. In some instances, a link could be lost between two endpoints with the bearer path remaining intact. Thus, a real-time protocol (RTP) stream could be operational, but the signaling connection has been lost. This could present a situation in which two parties are talking and are oblivious to the problem. Communications platform 50 can detect the scenario and address it accordingly.

It is not necessarily appropriate to initiate a call disconnect over the SIP trunk because these parties may still be conversing. However, it is desirable to clean up resources when it is detected that one of the endpoints disappears. In theory, communication system 10 has the ability to identify that a connection may have been lost and, further, that it is appropriate to contact a peer on the far end of the call and confirm whether that endpoint believes that the two conversing parties are still engaged in a call. Once an 'absent' endpoint is detected, periodic reinvites may be initiated through the SIP trunk in order to solicit a response from the peer agent. The objective is to reconnect that missing link.

The reinvite message would then spawn a new session to be established because the RTP session (in this example) is still alive and active. Before performing any number of operations, the protocol ensures that the far-end agent believes that the call is still functional and occurring.

Communications platform 50 (e.g. the Call Manager in this example) on either side could be hung during such scenario. Note that a natural response to this problem may be to incorrectly attempt to tear down a live call. This could be triggered by one or more session timers. Consider the likely scenario where communications platform 50 loses contact from both ends. If all connectivity is lost, both from the endpoint and from the SIP agent to which the individual was utilizing, then the Call Manager becomes isolated. Communication system 10 offers a mechanism that can accurately identify when a connection has been lost.

Communications platform 50, which may be provided in any portion of endpoints 12*a-d*, can offer a call-preservation mode, whereby a BYE message is not necessarily sent from one endpoint to another because the two endpoints may still be communicating. However, from a resource perspective, the call leg still needs to be accounted for by communications platform 50. Thus, cleaning up the session, either by electing to continue with the call or by deleting and tearing down the call, conserves the resources of the network.

In cases where the reinvite does not successfully reestablish the missing link, then resources are preserved because the call is disconnected. Thus, if the reinvite is ignored and then subsequently ignored in a retry, then the call can be torn down.

Note that without the capabilities of communication system 10, resources would not be properly conserved. For example, during peak hours, call attempt rates would be poor. In other scenarios, security or quality of service parameters may suffer significantly. Communication system 10 overcomes these issues by offering a smart system that keeps calls alive and that avoids interrupting calls that are functional. Signaling is involved during call setup and during calling tear down, but no mechanism is provided to monitor the status of the call during the life or the span of the call. Detection of a signaling path error is provided by the present invention in ensuring that a call is active. In cases where the call is dormant or stagnant, then the associated network resources may be appropriately cleaned up. Hence, the present invention offers call resiliency, as well as enhanced efficiency in resource management.

Figure 2:
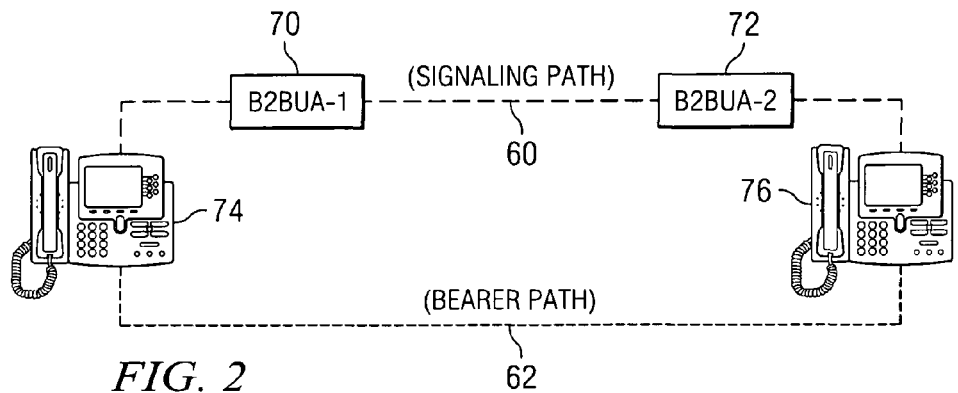
FIG. 2 is a simplified flowchart of an example operational flow associated with two paths of the communication system of FIG. 1.
Figure 3:
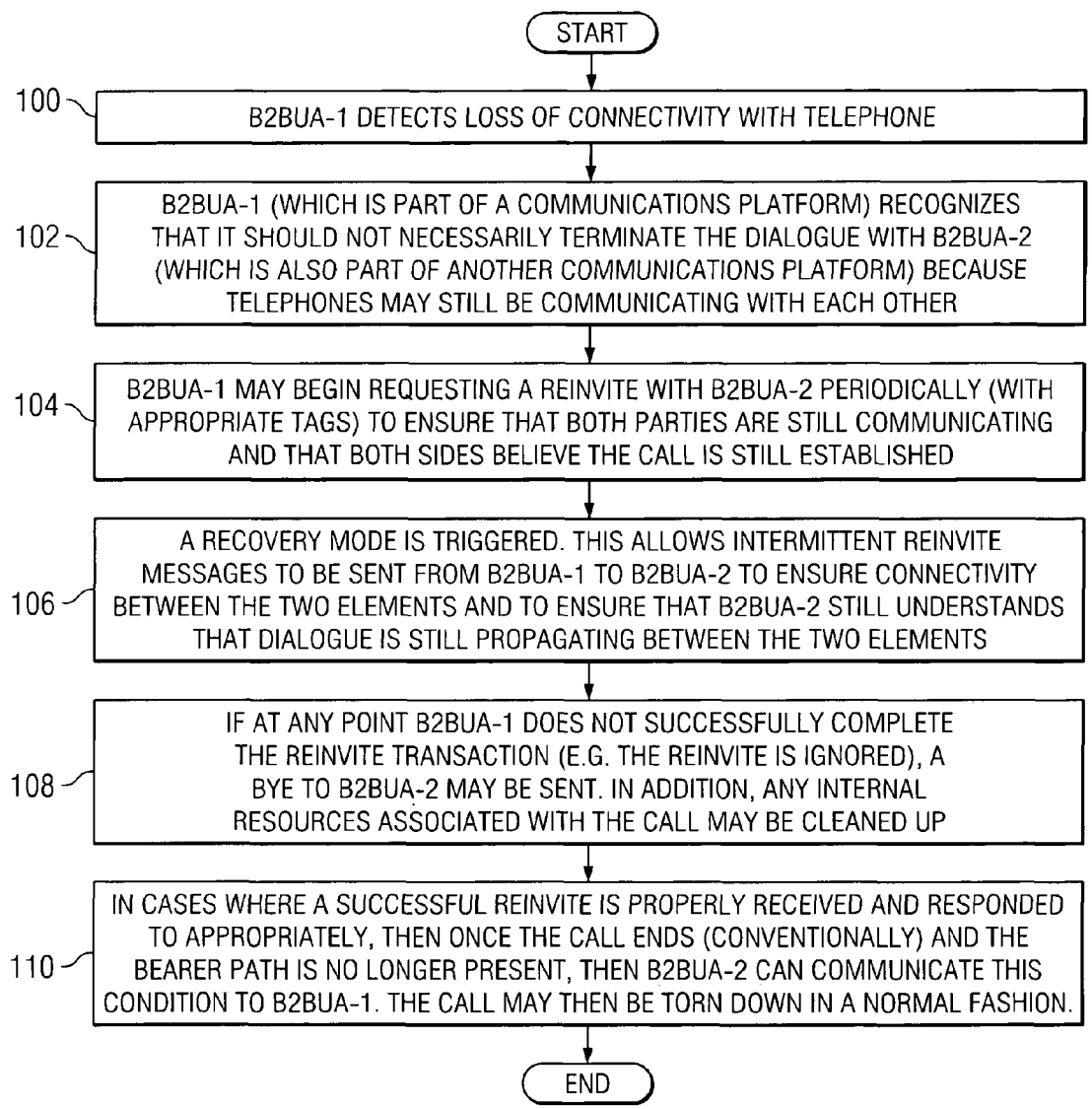
FIG. 3 is a simplified flowchart of an example operational flow associated with the communication system of FIG. 1.

FIG. 2 is a simplified block diagram of several paths associated with communication system 10. FIG. 2 includes a signaling path 60 and a bearer path 62. FIG. 2 also includes a B2BUA-1 70, which is associated with an IP telephone 74, and a B2BUA-2 72, which is associated with an IP telephone 76. This reflects a traditional SIP trapezoid configuration. Each B2BUA may be provided in a respective communications platform 50. Alternatively, the BSBUAs may be positioned in any other suitable location. Turning to FIG. 3, FIG. 3 is a simplified flowchart of an example operational flow of the present invention. FIG. 2 and FIG. 3 are discussed concurrently for purposes of providing additional clarity in describing some of the functionalities and capabilities of the present invention.

Note that there are scenarios where a B2BUA may somehow detect loss of connectivity with an endpoint, to which it is engaged. However, a loss of signaling path (where the voice data is being relayed back and forth) does not necessarily indicate a loss of bearer path since the two endpoints are delivering media (video, voice, text, audio, etc.) to each other directly. Hence, immediate termination of the call could be improper.

In this scenario, the B2BUA that detects this condition can enter a recovery mode to guard against an indefinitely hung call context since it may never receive a BYE from either the endpoint or its B2BUA peer due to isolation from both parties. The recovery mode can be used to periodically deliver a reinvite with an offer matching that of the previously provided SIP session description protocol (SDP). If the reinvite request is not successfully fulfilled (i.e. responded to), the lack of a response can be used as a condition to trigger cleanup of call resources on the B2BUA that initiated the recovery by sending a BYE to its B2BUA peer.

Consider an example in which B2BUA-1 detects a loss of connectivity with telephone 74. This is illustrated by step 100 of FIG. 3. This could be due to any number of reasons (e.g. a link goes down in the network). Both B2BUA-1 70 and BSBUA-2 72 can sense or detect this condition; both of these elements are also smart enough to know that that bearer path 62 is separate from signaling path 60.

In this example, B2BUA-1 70 (which is part of communications platform 50) recognizes that it should not necessarily terminate the dialogue with B2BUA-2 72 (which is also part of communications platform 50) because telephone 76 may still be communicating with telephone 74. This is illustrated by step 102. However (in step 104), B2BUA-1 70 may begin requesting a reinvite with B2BUA-2 72 periodically (with appropriate tags) to ensure that both parties are still communicating and that both sides believe the call is still established. Hence, rather that communicate a simple call disconnect from B2BUA-1 70 to B2BUA-2 72, a recovery mode is triggered. This allows intermittent reinvite messages to be sent from B2BUA-1 70 to B2BUA-2 72 to ensure connectivity between the two elements and to ensure that B2BUA-2 72 still understands that dialogue is still propagating between the two elements. This allows the call to remain alive within communications platform(s) 50. This is illustrated by step 106.

If at any point B2BUA-1 70 does not successfully complete the reinvite transaction (e.g. the reinvite is ignored and a retry is also ignored), a BYE to B2BUA-2 72 may be sent. In addition, any internal resources associated with the call may be cleaned up. This is illustrated by step 108. In cases where a successful reinvite is properly received and responded to appropriately, then once the call ends (conventionally) and bearer path 62 is no longer present, then B2BUA-2 72 can communicate this condition to B2BUA-1 70. The call may then be torn down in a normal fashion. This is illustrated by step 110.

Note that a tag could be provided in the reinvite that includes a call ID, as well as source and destination information: all of which correspond to the original invite in the call. The tag indicates that it is part of a unique dialogue. If the invite is sent without having a dialogue before, the "from" component would be tagged but not the "to" component. The endpoint would then be able to decipher this information and act accordingly. A simple table could be provided and maintained to accommodate this scenario.

Note that the benefits of the enhanced recovery mode feature can be achieved using standard analog telephone arrangements. Hence, even in cases where traditional telephone set-ups are employed, the system would still be capable of implementing an effective recovery mode.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention.

In addition, a number of these operations have been described as being executed concurrently with, or in parallel to, one or more additional operations. However, the timing of these operations may be altered considerably. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing enhanced, automated conversion functions.

Although the present invention has been described in detail with reference to particular embodiments, it should be understood that various other changes, substitutions, and alterations may be made hereto without departing from the spirit and scope of the present invention. For example, the illustrated network architecture of FIG. 1 has only been offered for purposes of example and teaching. Suitable alternatives and substitutions are envisioned and contemplated by the present invention: such alternatives and substitutions being clearly within the broad scope of communication system 10.

For example, the use of the LAN could easily be replaced by a virtual private network (VPN), a metropolitan area network (MAN), a wide area network (WAN), a wireless LAN (WLAN), or any other element that facilitates data propagation for endpoints 12*a*-*d*. Using analogous reasoning, the routers and switches illustrated by FIG. 1 may be supplanted by bridges, gateways, or any other suitable devices that are conducive to network communications. In addition, usage of the term 'B2BUA' herein includes any component that seeks to facilitate the communication process. In certain instances, the B2BUA could be a computer or any other electronic component that executes tasks associated with a communication session. Moreover, although 'voice' data has been highlighted in several examples, the present invention can readily be used in conjunction with sessions that involve video, text, audio, streaming data, or any other type of information. Such alternatives are clearly within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for facilitating a call in a session initiation protocol (SIP) environment, comprising:
    detecting, by a first agent, a potential lost connection of a signaling path coupling a first endpoint and a second endpoint, the signaling path configured to exchange signaling data for a call between the first and the second endpoint, the first agent being associated with the first endpoint;
    determining that a bearer path exchanging data for the call between the first and the second endpoint is functional while the signaling path coupling the first and the second endpoint for the call is lost, the bearer path configured to exchange data for the call between the first and the second endpoint;
    communicating a reinvite to a second agent that is associated with the second endpoint in order to determine whether the call between the first endpoint and the second endpoint is active; and
    maintaining the bearer path for the call while the signaling path is lost.

2. The method of claim 1, wherein the bearer path remains intact while it is determined whether the call is active.

3. The method of claim 1, further comprising:
    identifying that the reinvite has not been successfully responded to;
    communicating a BYE to the second agent; and
    tearing down the call.

4. The method of claim 1, wherein the reinvite includes a tag that comprises a selected one or more of a call ID, source information, and destination information, all of which correspond to an original invite of the call.

5. The method of claim 1, wherein the first agent communicates one or more reinvites on a periodic basis.

6. The method of claim 1, wherein if the reinvite is not answered, a cleanup operation is initiated in order to conserve resources.

7. The method of claim 1, wherein the first agent is operable to distinguish a failure in the bearer path that carries data between the first and the second endpoint and a failure in the signaling path.

8. The method of claim 1, wherein the first and second endpoints are Internet protocol (IP) telephones and are operable to deliver voice data to each other.

9. The method of claim 1, wherein the first agent is included in a Call Manager element, and wherein the first agent is a back-to-back user agent (B2BUA).

10. An apparatus for facilitating a call in a session initiation protocol (SIP) environment, comprising:
    a first agent operable to:

detect a potential lost connection of a signaling path coupling a first endpoint and a second endpoint, the signaling path configured to exchange signaling data for a call between the first and the second endpoint, the first agent being associated with the first endpoint, determine that a bearer path exchanging data for the call between the first and the second endpoint is functional while the signaling path coupling the first and the second endpoint for the call is lost, the bearer path configured to exchange data for the call between the first and the second endpoint, communicate a reinvite to a second agent that is associated with the second endpoint in order to determine whether the call between the first endpoint and the second endpoint is active; and maintaining the bearer path for the call while the signaling path is lost.

11. The apparatus of claim 10, wherein the bearer path remains intact while it is determined whether the call is active.

12. The apparatus of claim 10, wherein the first agent is further operable to:
identify that the reinvite has not been successfully responded to;
communicate a BYE to the second agent; and
tear down the call.

13. The apparatus of claim 10, wherein the reinvite includes a tag that comprises a selected one or more of a call ID, source information, and destination information, all of which correspond to an original invite of the call.

14. The apparatus of claim 10, wherein the first agent is included in a Call Manager element.

15. The apparatus of claim 10, wherein the first agent is a back-to-back user agent (B2BUA).

16. One or more memories of a computer encoded with software for facilitating a call in a session initiation protocol (SIP) environment, the software when executed by a computer operable to:

detect a potential lost connection of a signaling path coupling a first endpoint and a second endpoint, the signaling path configured to exchange signaling data for a call between the first and the second endpoint;

determining that a bearer path exchanging data for the call between the first and the second endpoint is functional while the signaling path coupling the first and the second endpoint for the call is lost, the bearer path configured to exchange data for the call between the first and the second endpoint;

communicate a reinvite in order to determine whether the call between the first endpoint and the second endpoint is active; and maintaining the bearer path for the call while the signaling path is lost.

17. The one or more memories of claim 16, wherein the software is further operable to:
identify that the reinvite has not been successfully responded to;
communicate a BYE; and
tear down the call.

18. The one or more memories of claim 16, wherein the software is further operable to:
respond, if the reinvite is not answered, by performing a cleanup operation in order to conserve resources.

19. The one or more memories of claim 16, wherein the software is further operable to:
distinguish a failure in the bearer path that carries data between the first and the second endpoint and a failure in the signaling path.

20. The one or more memories of claim 16, wherein the reinvite is communicated on a periodic basis.

* * * * *